US011244267B2

(12) United States Patent
Panikkar et al.

(10) Patent No.: US 11,244,267 B2
(45) Date of Patent: Feb. 8, 2022

(54) DIGITAL FULFILLMENT PRODUCT ONBOARDING SYSTEM

(71) Applicant: Dell Products L.P., Round Rock, TX (US)

(72) Inventors: Shibi Panikkar, Bangalore (IN); Deepali S. Mali, Bengaluru (IN)

(73) Assignee: Dell Products L.P., Round Rock, TX (US)

(*) Notice: Subject to any disclaimer, the term of this patent is extended or adjusted under 35 U.S.C. 154(b) by 77 days.

(21) Appl. No.: 16/395,969

(22) Filed: Apr. 26, 2019

(65) Prior Publication Data
US 2020/0342381 A1    Oct. 29, 2020

(51) Int. Cl.
G06Q 10/06    (2012.01)

(52) U.S. Cl.
CPC ... *G06Q 10/06316* (2013.01); *G06Q 10/0633* (2013.01)

(58) Field of Classification Search
CPC .... G06Q 20/322; G06Q 20/12; G06Q 10/087; G06Q 10/06316; G06Q 10/063; G06Q 10/0633; G06Q 30/0202; G06Q 30/0201
See application file for complete search history.

(56) References Cited

U.S. PATENT DOCUMENTS

| 2005/0235282 A1* | 10/2005 | Anderson | G06Q 20/3674 717/178 |
| 2006/0235690 A1* | 10/2006 | Tomasic | G06F 3/0481 704/257 |
| 2008/0183591 A1* | 7/2008 | Olsson | G06Q 30/0601 705/26.1 |
| 2010/0131792 A1* | 5/2010 | Herrod | G06F 11/0748 714/2 |
| 2011/0191132 A1* | 8/2011 | Westcott | G06Q 10/06 705/7.11 |
| 2011/0239126 A1* | 9/2011 | Erickson, Jr. | H04L 41/22 715/744 |
| 2014/0012856 A1* | 1/2014 | Abdelrahman | G06Q 30/0635 707/740 |
| 2014/0351817 A1* | 11/2014 | Sawamura | H04N 1/00244 718/102 |
| 2016/0065417 A1* | 3/2016 | Sapuram | H04L 47/70 709/223 |

(Continued)

OTHER PUBLICATIONS

Abbasi, E. K., Hubaux, A., Heymans, P. (2011). A Toolset for Feature-Based Configuration Workflows. 15th International Software Product Line Conference, 65-69. (Year: 2011).*

*Primary Examiner* — William S Brockington, III
(74) *Attorney, Agent, or Firm* — Terrile, Cannatti & Chambers; Stephen A. Terrile

(57) ABSTRACT

A system, method, and computer-readable medium are disclosed for performing a digital fulfillment product onboarding operation. The digital fulfillment product onboarding operation includes: receiving an order for a digital asset; deriving digital fulfillment attributes associated with the digital asset; identifying a digital asset fulfillment process flow from a plurality of digital asset fulfillment process flows, the identifying being based upon the order for the digital asset and the attributes associated with the digital asset; plotting the digital asset fulfillment process flow; and, executing the digital asset fulfillment process flow.

17 Claims, 12 Drawing Sheets

(56) References Cited

U.S. PATENT DOCUMENTS

| | | | | |
|---|---|---|---|---|
| 2016/0132805 A1* | 5/2016 | Delacourt | ............... | G06F 8/71 |
| | | | | 705/7.23 |
| 2016/0378747 A1* | 12/2016 | Orr | ............... | G06F 40/30 |
| | | | | 704/9 |
| 2020/0136930 A1* | 4/2020 | Szulman | ............... | G06F 9/5077 |

* cited by examiner

DIGITAL FULFILLMENT PRODUCT ONBOARDING SYSTEM

BACKGROUND OF THE INVENTION

Field of the Invention

The present invention relates to information handling systems. More specifically, embodiments of the invention relate to automating the fulfillment of a digital asset.

Description of the Related Art

As the value and use of information continues to increase, individuals and businesses seek additional ways to process and stole information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

A system, method, and computer-readable medium are disclosed fir automating the fulfillment of a digital asset.

More specifically, in one embodiment the invention relates to a computer-implementable method for performing a digital fulfillment product onboarding operation, comprising: receiving an order for a digital asset: deriving digital fulfillment attributes associated with the digital asset; identifying a digital asset fulfillment process flow from a plurality of digital asset fulfillment process flows, the identifying being based upon the order for the digital asset and the attributes associated with the digital asset; plotting the digital asset fulfillment process flow; and, executing the digital asset fulfillment process flow.

In another embodiment the inventions to a system comprising: a processor; a data bus coupled to the processor; and a non-transitory, computer-readable storage medium embodying computer program code, the non-transitory, computer-readable storage medium being coupled to the data bus, the computer pro ram code interacting with a plurality of computer operations and comprising instructions executable by the processor and configured for: receiving an order for a digital asset; deriving digital fulfillment attributes associated with the digital asset; identifying a digital asset fulfillment process flow from a plurality of digital asset fulfillment process flows, the identifying being based upon the order for the digital asset and the attributes associated with the digital asset; plotting the digital asset fulfillment process flow; and, executing the digital asset fulfillment process flow.

In another embodiment the invention relates to a computer-readable storage medium embodying computer program code, the computer program code comprising computer executable instructions configured for: receiving an order for a digital asset; deriving digital fulfillment attributes associated with the digital asset; identifying a digital asset fulfillment process flow from a plurality of digital asset fulfillment process flows, the identifying being based upon the order for the digital asset and the attributes associated with the digital asset; plotting the digital asset fulfillment process flow; and, executing the digital asset fulfillment process flow.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A system, method, and computer-readable medium are disclosed for automating the fulfillment of a digital asset. In certain embodiments a data-driven digital asset fulfillment operation applies a data-driven artificial intelligence operation to derive an optimum digital asset fulfillment process flow as well as which digital asset entitlement attributes should be applied when fulfilling a particular digital asset. In certain embodiments, the data-driven digital asset fulfillment operation generates a set of relevant questions which can be used when applying the data-driven artificial intelligence operation. If a particular digital asset does not conform to any existing digital asset fulfillment process flows, then the data-driven artificial intelligence operation suggests an optimum digital asset fulfillment process flow and probable digital asset entitlement attributes to be used when performing the digital asset fulfillment operation.

Certain aspects of the present disclosure include an appreciation that when a new product is integrated into a company's product suite, other existing products often need to be configured With a plurality of associated attributes. When the product includes a digital asset, the process is referred to as digital fulfillment operation. For the purposes of this disclosure, a digital fulfillment operation may be defined as the process of delivering a product in digital form (e.g., as a digital download). Certain aspects of the present disclosure include an appreciation that a digital asset fulfillment process flow can change depending upon the configuration of a particular digital asset entitlement attribute.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
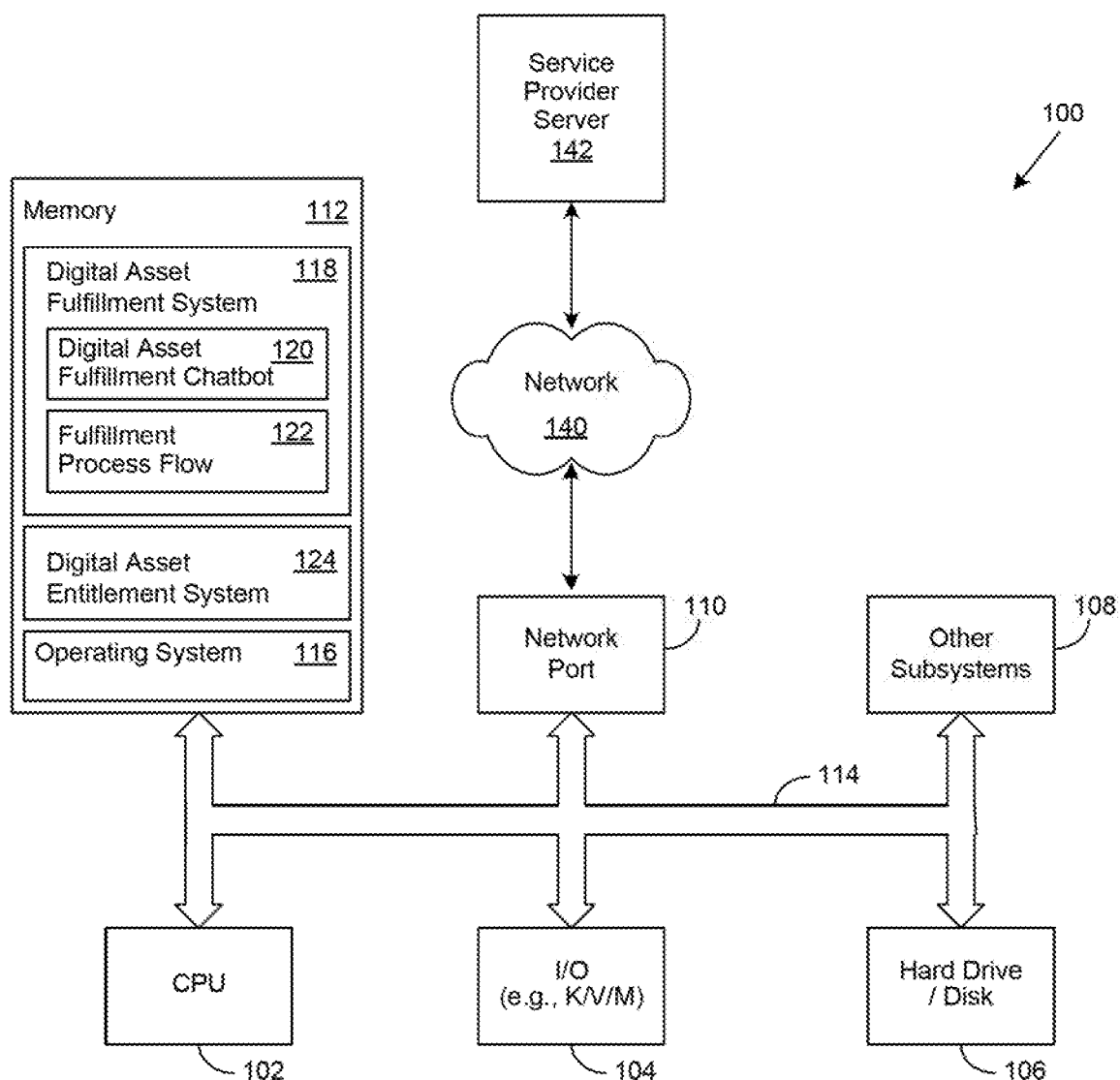
FIG. 1 shows a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, a touchpad or touchscreen, and associated controllers, a hard drive or disk storage 106, and various other subsystems 108, In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating, system (OS) 116 and in various embodiments may also comprise a digital asset fulfillment system 118. In certain embodiments, the digital asset fulfillment system 118 may include a digital asset fulfillment chatbot 120 module, or a fulfillment process flow 122 module, or both. In one embodiment, the information handling system 100 is able to download the digital asset fulfillment system 118 from the service provider server 142.

In another embodiment, the digital asset fulfillment system 118 is provided as a service from the service provider server 142.

The digital asset fulfillment system 118 performs a digital asset fulfillment operation. The digital asset fulfillment operation improves processor efficiency, and thus the efficiency of the information handling system 100, facilitating the digital asset fulfillment operation. In certain embodiments, the digital asset fulfillment operation can facilitate the fulfillment of a digital asset during operation of an information handling system 100. As will be appreciated, once the information handling system 100 is configured to perform the digital fulfillment operation, the information handling system 100 becomes a specialized computing device specifically configured to perform the digital fulfillment operation and is not a general purpose computing device. Moreover, the implementation of the digital fulfillment operation on the information handling system 100 improves the functionality of the information handling system 100 and provides a useful and concrete result of facilitating the fulfillment of a digital asset. In certain embodiments, the digital fulfillment operation results in the realization of more efficient and accurate fulfillment of a digital asset.

Figure 2:
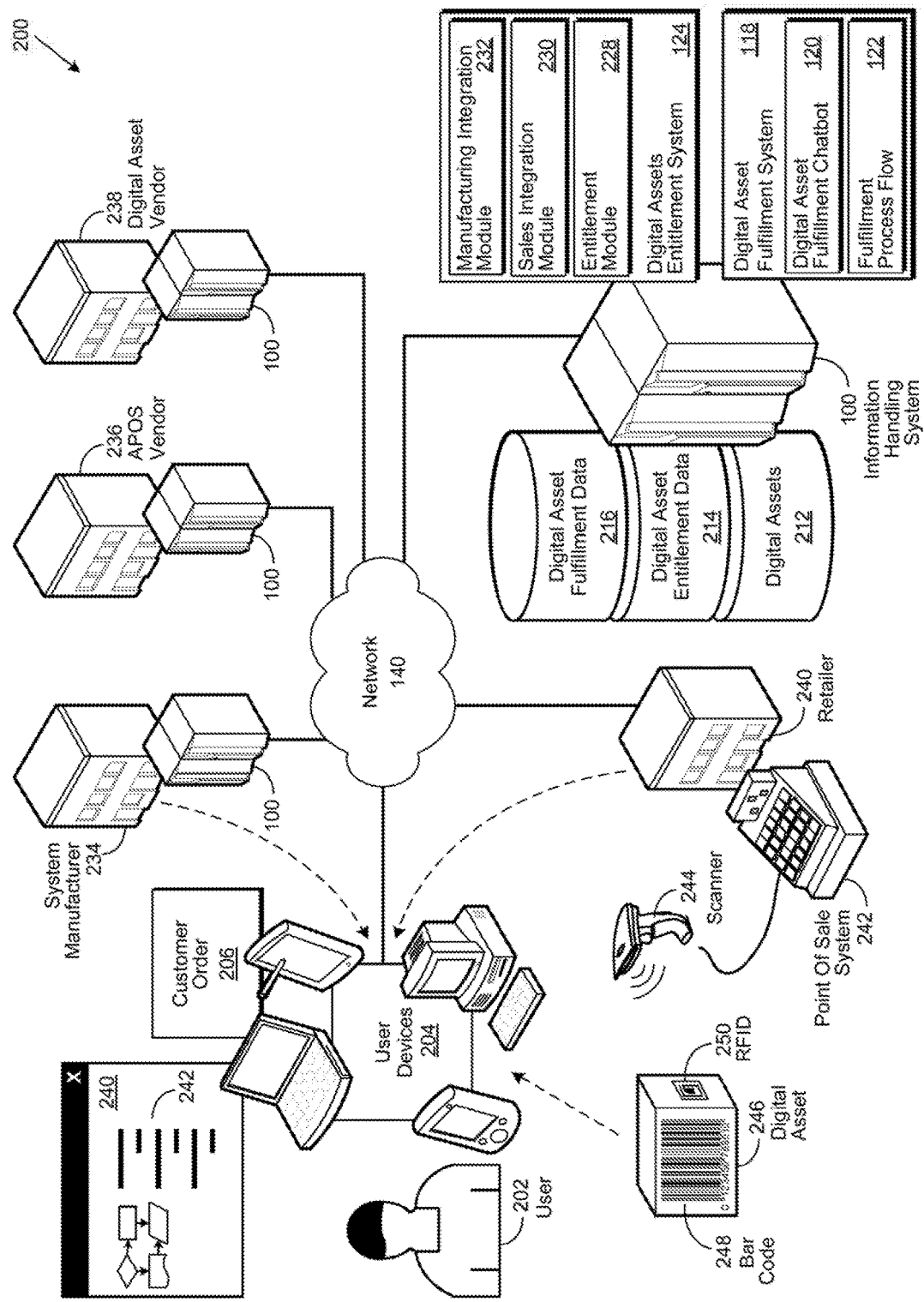
FIG. 2 is a block diagram of a digital asset fulfillment environment implemented in accordance with an embodiment of the invention.

FIG. 2 is a block diagram of a digital asset fulfillment environment implemented in accordance with an embodiment of the invention. As used herein, a digital asset 246 broadly refers to anything that exists in a binary form with an associated right to use. Examples of a digital asset include a software application, audible or viewable content, a deliverable or performable service, a license key, personalization instructions, data and document files, and so forth. As likewise used herein, in the context of a digital asset, fulfillment broadly refers to the process of providing an item, product or service in a digital form to a customer. In certain embodiments, a digital asset may be fulfilled, wholly or partially, in the form of a computer-readable storage medium, via a network 140, or as a service, such as a cloud-based service familiar to those of skill in the art.

In certain embodiments, the digital assets fulfillment environment 200 may include a digital asset fulfillment system 118 and a digital assets entitlement system 124. In certain embodiments, the digital asset fulfillment environment 200 may include a repository of digital asset fulfillment data 216. In certain embodiments, the repository of digital asset fulfillment data 21 may be local to the system executing the digital asset fulfillment system 118 or may be executed remotely. In certain embodiments, the digital asset fulfillment system 118 may include a digital asset fulfillment chatbot 120 module and a fulfillment process flow 122 module.

In certain embodiments, the digital asset fulfillment system 118 may be implemented to facilitate the fulfillment of a digital asset 246, In certain embodiments, the fulfillment of a digital asset 246 may be associated with a customer order 206 for hardware and one or more associated digital assets 246. As an example, a customer 202 may place a customer order 206 with a system manufacturer 234 for a personal computer, To continue the example, the customer 202 may wish the system manufacturer 234 to install an operating system and various software applications as part of the customer order 206. In this example, the operating system and software applications are digital assets 246 and various operations associated with their installation on the personal computer would be part of a digital asset fulfillment process flow. In certain embodiments, the fulfillment of a digital asset 246 may be associated with a customer order 206 for one or more digital assets 246 and no associated hardware.

In certain embodiments, the digital asset fulfillment chatbot 120 module may be implemented to interact with a user 202 to collect input data associated with fulfillment of a particular digital asset 246. In certain embodiments, the interaction with a user 202 may include a series of prompts or questions provided by the digital asset fulfillment chatbot 120 module and associated responses provided by the user 202. In various embodiments, the input data resulting from the interaction between the user 202 and the digital asset fulfillment chatbot 120 may be processed by the digital asset fulfillment system 118 to generate certain digital asset fulfillment data. In certain embodiments, the fulfillment process flow 122 module may be implemented to process the resulting digital asset fulfillment data to determine the most applicable digital asset fulfillment process flow for fulfillment of the digital asset 246, as described in greater detail herein.

In certain embodiments, the most applicable digital asset fulfillment process flow may already exist. In certain embodiments, existing digital asset fulfillment process flows may be stored in the repository of digital asset fulfillment data 216. In certain embodiments, the most applicable digital asset fulfillment process flow may not exist. In various embodiments, the fulfillment process flow 122 module may be implemented to process certain digital asset fulfillment data to generate the most applicable digital asset fulfillment process flow, as likewise described in greater detail herein. In certain embodiments, digital asset fulfillment process flows generated by the fulfillment process flow 122 module may be stored in the repository of digital asset fulfillment data 216 for future use.

In certain embodiments, a user 202 may use a user device 204 to interact with the digital asset fulfillment system 118. As used herein, a user device 204 refers to an information handling system such as a personal computer, a laptop computer, a tablet computer, a personal digital assistant (PDA), a smart phone, a mobile telephone, or other device capable of communicating and processing data. In certain embodiments, the user device 204 may be configured to present a digital asset fulfillment system user interface (UI) 240. In certain embodiments, the digital asset fulfillment system UI 240 may be implemented to present a graphical representation 242 of digital asset fulfillment information, which is automatically generated in response to interaction with the digital asset fulfillment system 118.

In certain embodiments, the user device 204 may be used to exchange information between the user 202 and the digital asset fulfillment system 118, a system manufacturer 234, an after point of sale (APOS) vendor 236, a digital assets vendor 238, a retailer 240, or a combination thereof through the use of a network 140. In certain embodiments, the network 140 may be a public network, such as a public internet protocol (IP) network, a physical private network, a wireless network, a virtual private network (VPN), or any combination thereof. In certain embodiments, the information exchanged between the user device 204 and the digital asset fulfillment system 118, a system manufacturer 234, an after point of sale (APOS) vendor 236, a digital assets vendor 238, a retailer 240, or a combination thereof, may be respectively exchanged with, and executed on, an associated information handling system 100. Skilled practitioners of the art will recognize that many such embodiments are possible and the foregoing is not intended to limit the spirit, scope or intent of the invention.

In certain embodiments, the digital asset fulfillment system UI 240 may be presented via a website. In certain embodiments, the website may be provided by one or more of the digital asset fulfillment system 118. For the purposes of this disclosure a website may be defined as a collection of related web pages which are identified with a common domain name and is published on at least one web server. A website may be accessible via a public IP network or a private local network.

A web page is a document which is accessible via a browser which displays the web page via a display device of an information handling system. In various embodiments, the web page also includes the file which causes the document to be presented via the browser. In various embodiments, the web page may comprise a static web page, which is delivered exactly as stored and a dynamic web page, which is generated by a web application that is driven by software that enhances the web page via user input to a web server.

In certain embodiments, a digital assets entitlement system 124 may be implemented in combination with the digital asset fulfillment system 118 to process a digital asset 246 as part of a digital asset fulfillment process flow. In certain embodiments, the digital asset 246 is processed to entitle its use by a customer on an associated system. In certain embodiments, the digital assets entitlement system 124 may be implemented on one or more information handling systems 100, which may be connected to a network 140.

In certain embodiments, the digital assets entitlement system 124 may be implemented to include an entitlement module 228, a sales integration module 230, and a manufacturing integration module 232. In certain embodiments the digital assets entitlement system 124 may be implemented to access repositories of digital assets 212, digital asset entitlement data 214, and digital asset fulfillment data 216, each of which may be implemented on one or more information handling systems 100 connected to a network 140.

As used herein, digital asset entitlement broadly refers to granting a recipient the right to use a particular aspect of a digital asset 246 under certain conditions. In various embodiments, the recipient may be an individual, a group of individuals, an organization, a device, or a system. Examples of such a system include an information handling system 100, a server, a personal computer, a laptop computer, a tablet computer a personal digital assistant (PDA), a mobile telephone. In certain embodiments, the right to use may be defined by various attributes, such as time, usage, breadth, and depth. As an example, a digital asset entitlement may grant fifty concurrent users within an organization the right to use certain portions of a particular digital asset for a period not to exceed one year.

In certain embodiments, a digital asset entitlement record may be implemented to contain various digital asset entitlement data. In certain embodiments, the digital asset entitlement record may be associated with a recipient of the digital asset entitlement. In certain embodiments, the digital asset entitlement record may be processed by the entitlement module 228 and stored in the repository of digital asset entitlement data 214.

In certain embodiments, digital asset entitlement operations may be performed in either a physical environment or an on-line environment. Examples of a physical environment may include a retailer 240 operating a physical point-of-sale (POS) system 242. Likewise, examples of an on-line environment may include a system manufacturer 234, an after-point-of-sale (APOS) vendor 236, a digital assets vendor 238, and a retailer 240, which respectively accept on-line customer orders 206 for digital assets over a connection to network 140.

In certain embodiments, the manufacturing integration module 232 may be implemented to coordinate the manufacture of a pre-configured or custom-configured system with the digital asset fulfillment system 118. In certain embodiments, a particular digital asset 246 may be physically represented as images and text on a card or a package, yet the digital asset itself may not be contained within the card or package. In certain embodiments, the physical representation of the digital asset may be scanned with a scanner 244, followed by scanning its corresponding digital asset activation key or other entitlement data.

In certain embodiments, it may not be necessary to scan the digital asset activation key or other entitlement data as it may be provided by the digital asset entitlement system 124 during the performance of digital asset entitlement operations, as described in greater detail herein. In certain embodiments, the digital assets product ID, its associated activation key, or associated entitlement data, may be represented by a bar code 248 or other indicia on a card or physical package. In certain embodiments, the digital assets product ID, its associated activation key, or associated entitlement data, may be contained in a radio frequency identifier (RFID) 250 tag affixed to the physical representation of the digital asset. Those of skill in the art will realize that many such embodiments are possible and that the foregoing is not intended to limit the spirit, scope, or intent of the invention.

In certain embodiments, the sales integration, module 230 may be implemented in combination with the digital asset fulfillment system 118 to complete a purchase transaction of a particular digital asset 246. In certain embodiments, the purchase transaction may be one or more steps of an associated digital asset fulfillment process flow, described in greater detail herein In certain embodiments, the financial proceeds of the purchase transaction may be settled between multiple parties. For example, a system manufacturer 234 may receive a portion of the purchase transaction corresponding to the cost of a system they provide. Likewise, one or more digital asset vendors 238 may receive a proportionate share of the purchase transaction corresponding to the digital asset 246 they respectively provide.

In certain embodiments, the entitlement module 228 may be implemented to generate, and then correlate, digital asset entitlement data to a customer order 206. In certain embodiments, the resulting digital asset entitlement data may be stored in the repository of digital asset entitlement data 214. In certain embodiments, the digital asset entitlement module 228 may be implemented to manage the location of a particular digital asset, and its associated digital assets entitlement data, to initiate its fulfillment by the digital asset fulfillment system 118. Skilled practitioners of the art will recognize that many such embodiments are possible. Accordingly, the foregoing is not intended to limit the spirit, scope, or intent of the invention.

Figure 3:
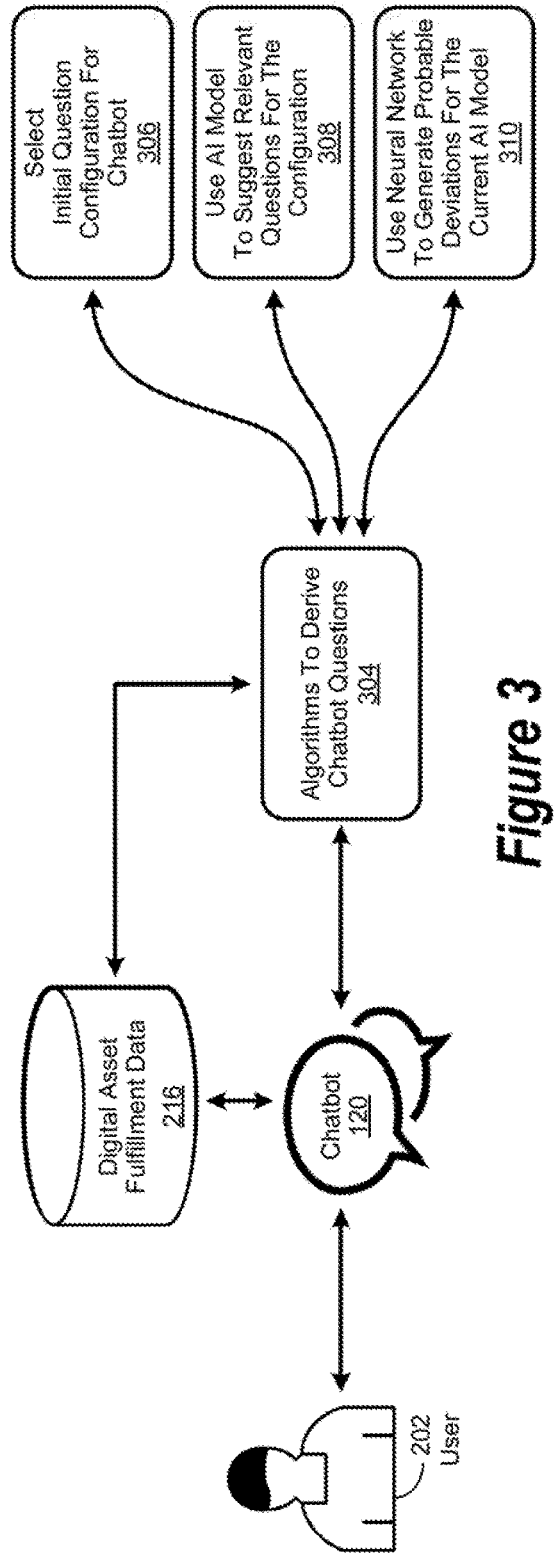
FIG. 3 is a simplified process flow diagram showing the use of algorithms for deriving chatbot questions associated with fulfillment of a digital asset.

FIG. 3 is a simplified process flow diagram showing the use of algorithms implemented in accordance with an embodiment of the invention to derive chatbot questions associated with fulfillment of a digital asset. In certain embodiments, a digital asset fulfillment chatbot 120 module may be implemented to interact with a user 202 to collect input data associated with an order for a particular digital asset. As used herein a chatbot, also commonly referred to as a smartbot, conversational interface, conversational artificial intelligence (AI), talkbot, or conversational entity, broadly refers to a computer program, or artificial intelligence approach, implemented to conduct an auditory, visual, or textual interaction with a user 202. In certain embodiments, the interaction with a user 202 may include a series of prompts or questions provided by the digital asset fulfillment chatbot 120 module and associated responses provided by the user 202. In various embodiments, the input data resulting from the interaction between the user 202 and the digital, asset fulfillment chatbot 120 may be processed by a digital asset fulfillment system, described in greater detail herein, to generate certain digital asset fulfillment data 216.

In certain embodiments, the resulting digital asset fulfillment data 216 may be processed by various algorithms in step 304 to select an initial question configuration in step 306 for the digital asset fulfillment chatbot 120. In certain embodiments, responses provided by the user 202 to the initial questions may likewise be processed by the digital asset fulfillment system to generate additional digital asset fulfillment data 216. In certain embodiments, the resulting additional digital asset fulfillment data 216 may be processed by various algorithms in step 304 to in turn use a particular artificial intelligence (AI) model in step 308 to suggest additional relevant questions for the digital asset fulfillment chatbot 120 to present to the user 202, In these embodiments, the AI model selected for use in step 308 is a matter of design choice.

In certain embodiments, responses provided by the user 202 to the additional questions generated in step 308 may likewise be processed by the digital asset fulfillment system to generate additional digital asset fulfillment data 216. In certain embodiments, the resulting additional digital, asset fulfillment data 216 may in turn be processed by various algorithms in step 304 for use by a neural network in step 310 to suggest generate probable deviations to the AI currently in use. In these embodiments, the neural net selected for use in step 308, and the method by which it is implemented, is a matter of design choice. In certain embodiments, the interactions between the user 202 and the digital asset fulfillment chatbot 120 are continued until sufficient digital asset fulfillment data 216 is collected to select an optimum digital asset fulfillment process flow.

Figure 4:
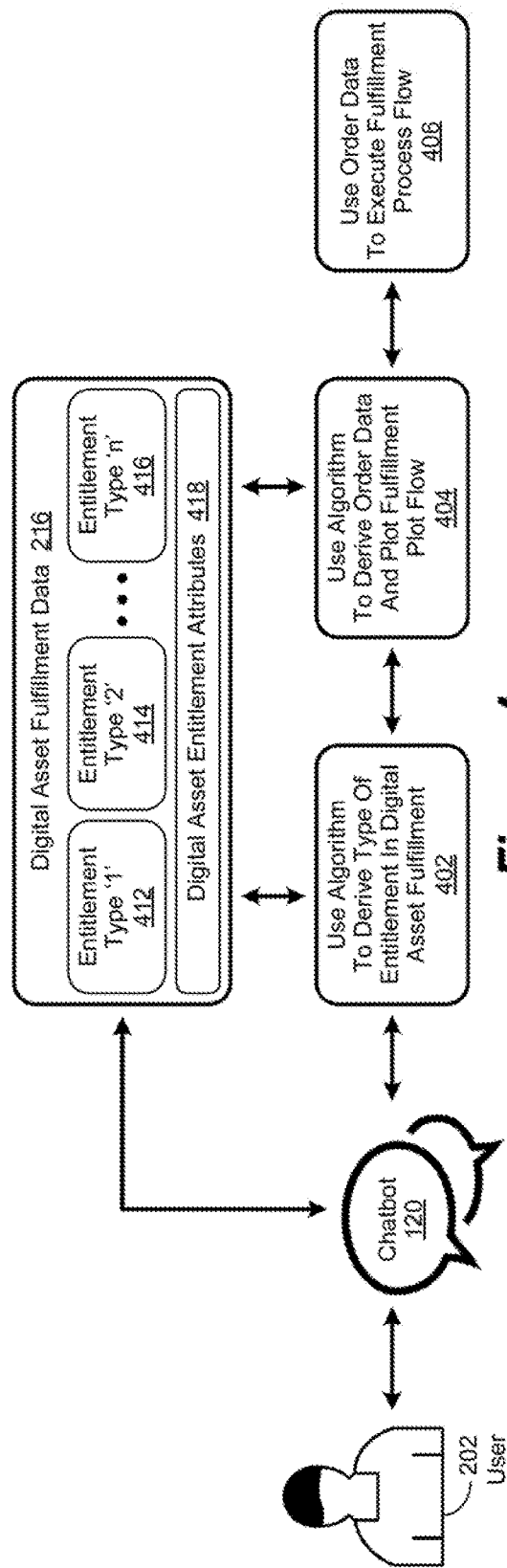
FIG. 4 is a simplified process flow diagram showing the use of algorithms for deriving a process flow associated with fulfillment of a digital asset.

FIG. 4 is a simplified process flow diagram showing the use of algorithms implemented in accordance with an embodiment of the invention to derive a process flow associated with fulfillment of a digital asset. In certain embodiments, a digital asset fulfillment chatbot 120 module may be implemented to interact with a user 202 to collect input data associated with entitlements, described in greater detail herein, corresponding to an order for a particular digital asset. In certain embodiments, the interaction with a user 202 may include a series of prompts or questions provided by the digital asset fulfillment chatbot 120 module and associated responses provided by the user 202.

In various embodiments, the input data resulting from the interaction between the user 202 and the digital asset fulfillment chatbot 120 may be processed by a digital asset fulfillment system, described in greater detail herein, to generate certain digital asset fulfillment data 216. In certain embodiments, the digital asset fulfillment data 216 may include information associated with various types of entitlements, such as entitlements '1' 412, '2' 414 through 'n' 416, and corresponding attributes 418 thereof. In certain embodiments, such digital asset fulfillment data 216 may be used by an algorithm in step 402 to derive one or more entitlement types associated with fulfillment of a particular digital asset, in certain embodiments, the digital asset entitlements derived in step 402 are used by an algorithm in step 404 to derive associated customer order data and to plot an optimum digital asset process flow. In certain embodiments, the resulting customer order data is then used in step 406 to execute the digital asset fulfillment process flow plotted in step 404.

Figure 5:
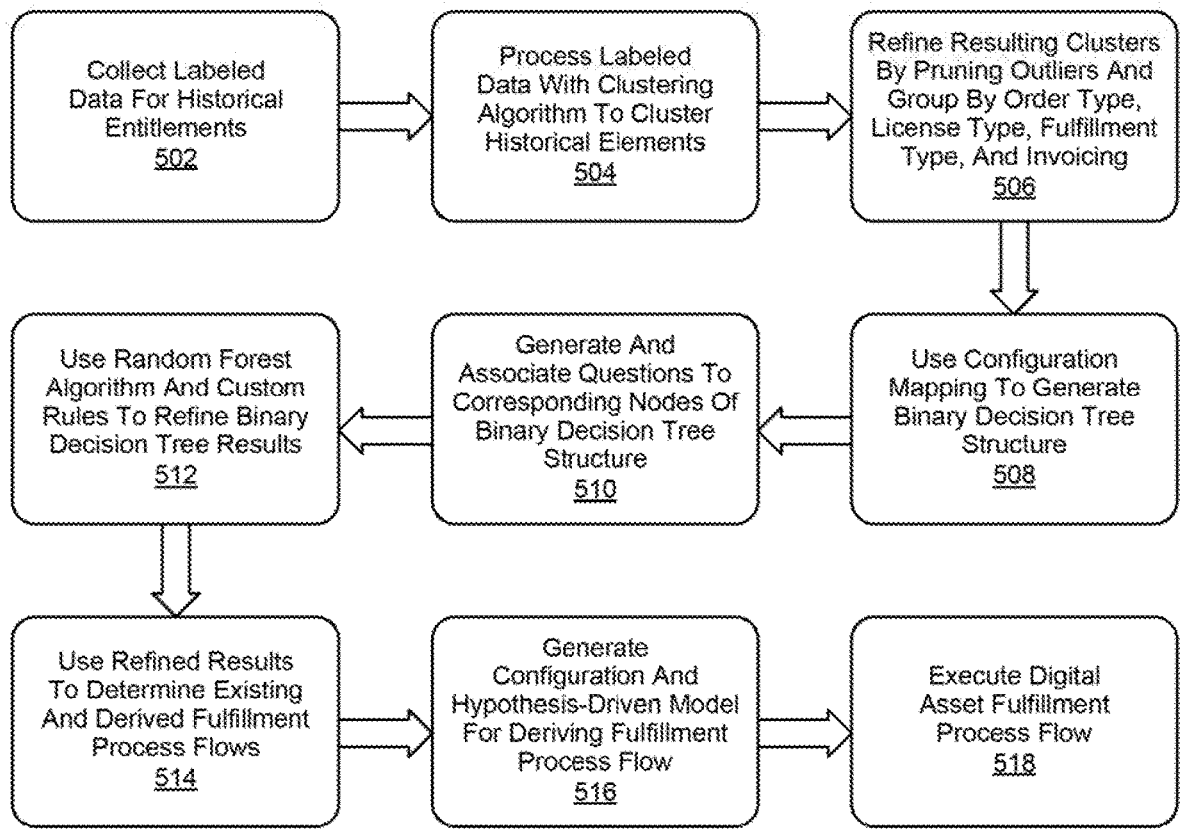
FIG. 5 is a simplified process flow diagram showing operations for fulfilling a digital asset.

FIG. 5 is a simplified process flow diagram showing operations implemented in accordance with an embodiment of the invention for fulfilling a digital asset. In this embodiment, labeled data associated with historical entitlements, described in greater detail herein, of a particular digital asset are collected in step 502. As used herein, labeled data broadly refers to samples of a dataset that have been augmented with meaningful tags that are informative. As an example, a digital asset may have an associated tag labeling its type, such as an operating system, a software application, a video file, and so on. As another example, the digital asset may have an associated, tag labeling its customer order type, such as being ordered as part of a customer order for hardware, or being ordered by itself or with other digital assets, with no hardware included in the customer order.

As yet another example, a digital asset may have an associated tag labeling its type of licensing, such as perpetual, recurring, per-use, number of concurrent users, Open source, and so forth. As yet still another example, a digital asset may have an associated tag labeling its fulfillment type, such as hardware factory install (HWFI), hardware factory install-no key (HWFI-NoKey), point of sale (POS), after point of sale (APOS), or digital download. Skilled practitioners of the art will recognize that many such examples of labeled data associated with a digital asset are possible. Accordingly, the foregoing not intended to limit the spirit, scope, or intent of the invention.

The labeled data is then processed in step 504 with a clustering algorithm to cluster the preponderance of various historical entitlements associated with the digital asset. In certain embodiments a modified k-means clustering algorithm may be implemented to generate the cluster of historical entitlements. As used herein, k-means clustering broadly refers to a method of vector quantization commonly used for cluster analysis in data mining. Skilled practitioners of the art will be aware that k-means clustering is commonly used to partition n observations into k clusters, in which each observation belongs to the cluster with the nearest mean, thereby serving as a prototype of the cluster.

In certain embodiments, the modification of the k-Means algorithm may be implemented to determine a first duster by taking a centroid based upon a model describing various digital asset entitlement types, digital asset fulfillment types, or a combination thereof. As used herein, a centroid, also known as a geometric center, broadly refers to the arithmetic mean position of all points within a plain figure, such as a cluster of data points produced by the implementation of a k-means clustering algorithm. In certain embodiments, the first cluster determined by the modified k-Means algorithm may correspond to a particular type of digital asset entitlement, described in greater detail herein. In certain embodiments, the first cluster determined by the modified k-Means algorithm may correspond to a particular digital asset fulfillment type, such as hardware factory install (HWFI), hardware factory install-no key (HWFI-NoKey), point of sale (POS), after point of sale (APOS), or digital download. In certain embodiments, a particular digital asset entitlement type, or digital asset fulfillment type, may be selected for the modified k-Means algorithm to determine a subsequent cluster. In these and other embodiments, the method by which a particular digital asset entitlement type, or digital asset fulfillment type, is selected for the modified k-Means algorithm to determine a first cluster, or a subsequent cluster, is a matter of design choice.

The resulting clusters of historical entitlements are then refined in step 506. In certain embodiments, the clusters may be refined by performing pruning operations familiar to those of skill in the art to disregard outlier data points associated with each cluster. In certain embodiments, the clusters may likewise be refined by grouping their respective data points into classes of historical entitlements. In certain embodiments, the classes of historical entitlements may include digital asset order types, license types, fulfillment types, invoice types, or a combination thereof.

In certain embodiments, a nave Bayes clustering algorithm may be implemented to group the clusters of data points into classes of historical entitlements. Skilled practitioners of the art will be familiar with naïve Bayes classifiers, which are a family of probabilistic classifiers commonly implemented when applying Bayes' theorem with strong, or nave, independence assumptions between features. Those of skill in the art will likewise be aware that various naïve Bayes approaches are a popular method of text categorization, where word frequencies are the features being categorized.

A configuration mapping is then used in step 508 to generate a binary decision tree structure. As used herein, a configuration mapping broadly refers to a correlation between a question associated with a particular node of a binary decision tree implemented to facilitate the fulfillment of a digital asset and certain related attributes thereof, hi certain embodiments, a response to a particular question may be used to determine which of a digital asset's associated attributes are relevant for use in its fulfillment. For example, a question may ask whether a key associated with a digital asset should be sent to the factory. If the response is positive, then the associated attribute may be set as "Install at Factory=Yes." In certain embodiments, the configuration mapping may be performed manually or automatically. In certain embodiments, the configuration mapping may be defined as an Extensible Mark-up Language (XML) file mapping.

Figure 8A:
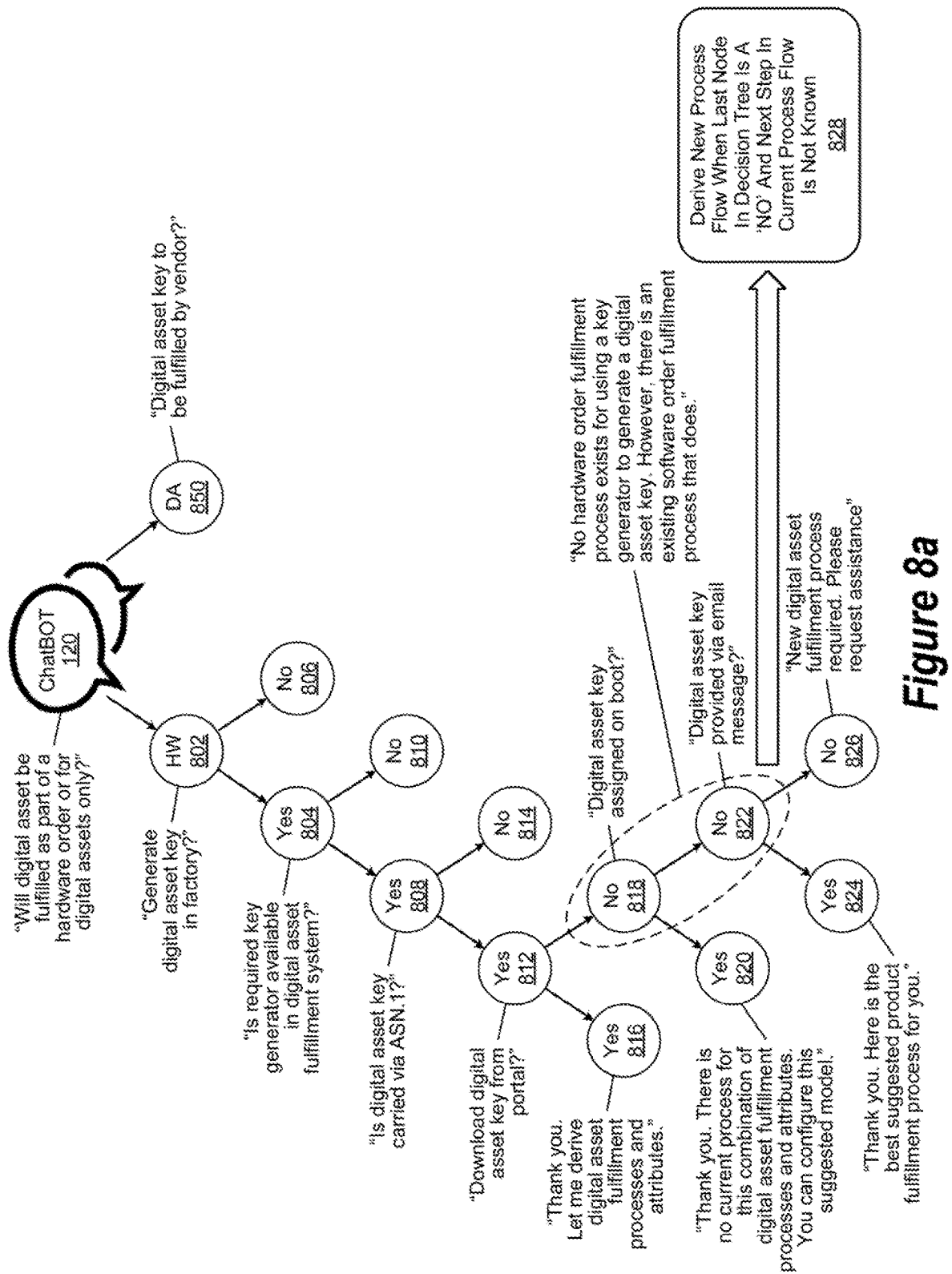
FIGS. 8a through 8c show a binary decision tree implemented to derive an alternative digital asset fulfillment process flow.

As likewise used herein, a binary decision tree structure broadly refers to a data structure that is used to represent a Boolean function. Digital asset entitlement questions are then generated and associated with corresponding nodes in the binary decision tree structure in step 510. In various embodiments, the dependency of certain cluster on other clusters is derived in the form of a binary decision tree and relevant questions are then associated with corresponding nodes to get the next node in the binary decision tree. As an example, a "left" node on the binary decision tree may be assigned a "yes" value and a corresponding "right" node may be assigned a "no" value, as shown in FIGS. 8*a* and 8*c*.

In certain embodiments, a random forest algorithm and custom rules may be used in step 512 to refine the resulting binary decision tree. As used herein a random forest algorithm, also known as a random decision forest algorithm, broadly refers to an ensemble learning method for classification, regression and other operations that are performed by constructing a plurality of decision trees at training time and outputting the class that is the mode of the classes (their classification), or mean prediction (the regression), of the individual trees. Skilled practitioners of the art will be aware that random decision forests are often implemented to correct for a decision tree's proclivity overfitting to their training set. In certain embodiments, the method by which the custom rules are selected and implemented is a matter of design choice.

The refined results are then used in step 514 to determine existing and derived digital asset fulfillment process flows. In certain embodiments, existing digital asset fulfillment process flows may be stored in a repository of digital asset fulfillment data. In certain embodiments an optimum digital asset fulfillment process flow may not exist in one digital asset order type, but may exist in another. In certain embodiments, a digital asset fulfillment process flow may be derived by associating an entitlement attribute to a corresponding node, or by mapping a node to a configuration, described in greater detail herein. If an optimum model for the digital asset fulfillment process flow does not exist, then an associated configuration and hypothesis-driven model for deriving an optimum digital asset fulfillment process flow is generated in step 516. In various embodiments, certain entitlement attributes may be suggested for addition to the digital asset fulfillment process flow. The optimum digital process flow is then executed in step 518.

Figure 6:
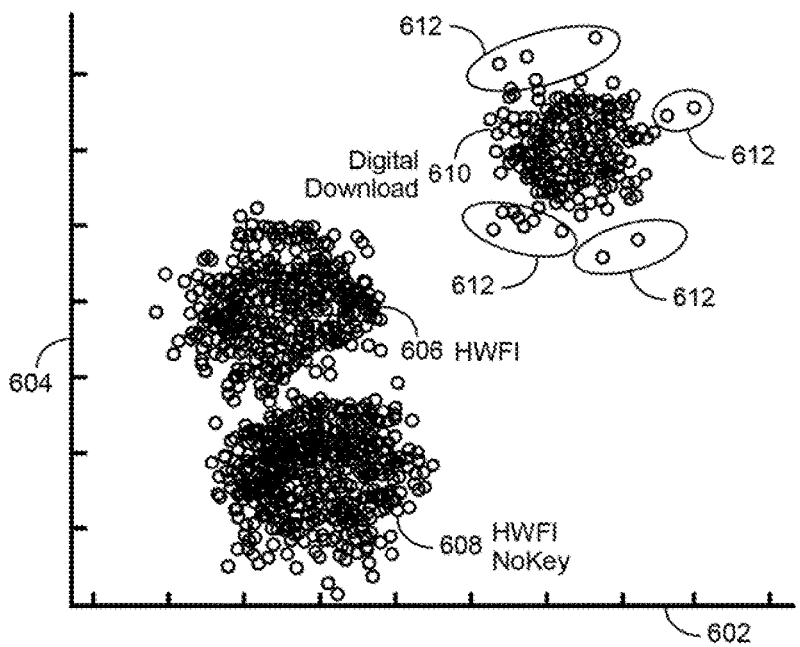
FIG. 6 shows a scatter plot depicting clusters of entitlement attributes associated with various digital asset fulfillment types.

FIG. 6 shows a scatter plot implemented in accordance with an embodiment of the invention to depict clusters of entitlement attributes associated with various digital asset fulfillment types. In various embodiments, as described in greater detail herein, certain digital asset fulfillment types may be used to fulfill a particular digital asset. Examples of such digital asset fulfillment types include hardware factory install (HWFI), hardware factory install-no key (HWFI-NoKey), point of sale (POS), after point of sale (APOS), and digital download.

In various embodiments, a particular digital asset may likewise have certain associated entitlement attributes for each digital asset fulfillment type used in its fulfillment. In certain embodiments, a modified k-Means clustering of historical digital asset entitlement data points, based upon an associated defined centroid, may be plotted as a scatter plot. For example, as shown in FIG. 6, clusters of digital asset entitlement data points associated with HWFI 606, HWFI-NoKey 608, and digital download 610 digital asset order types may be plotted against the number of associated digital asset entitlements 602 and the type of digital asset order type 604.

In certain embodiments, a k-Means algorithm may be implemented to derive a centroid of a cluster of digital asset entitlements. In various embodiments, the resulting clusters may be based upon certain digital asset order types. For example, digital asset order types HWFI, HWFI-NoKey, and digital download may be used by a k-Means algorithm to generate initial digital asset entitlement clusters 606, 608, and 610, where k=3, Certain embodiments of the invention reflect an appreciation that such an approach will typically result in the expedient generation of concentrated clusters, as opposed to typical k-Means implementations using iterative and random selection of centroids.

In various embodiments, pruning operations familiar to those of skill in the art may be implemented to remove certain outlier 612 data points associated with the HWFI 606, HWFI-NoKey 608, and digital download 610 clusters of digital asset entitlements. In certain embodiments, a naïve Bays and a modified k-Means algorithm may be implemented in combination to categorize various functionalities within each of the pruned clusters of digital asset entitlements 606, 608, 610. In certain embodiments, this categorization of functionalities may result in the identification of sub-clusters of digital asset entitlements. Examples of such sub-clusters of digital asset entitlements may include Factory Image Flag, KeyGen Present, ASNBased Entitlement, Fulfillment Method, and so forth.

Figure 7:
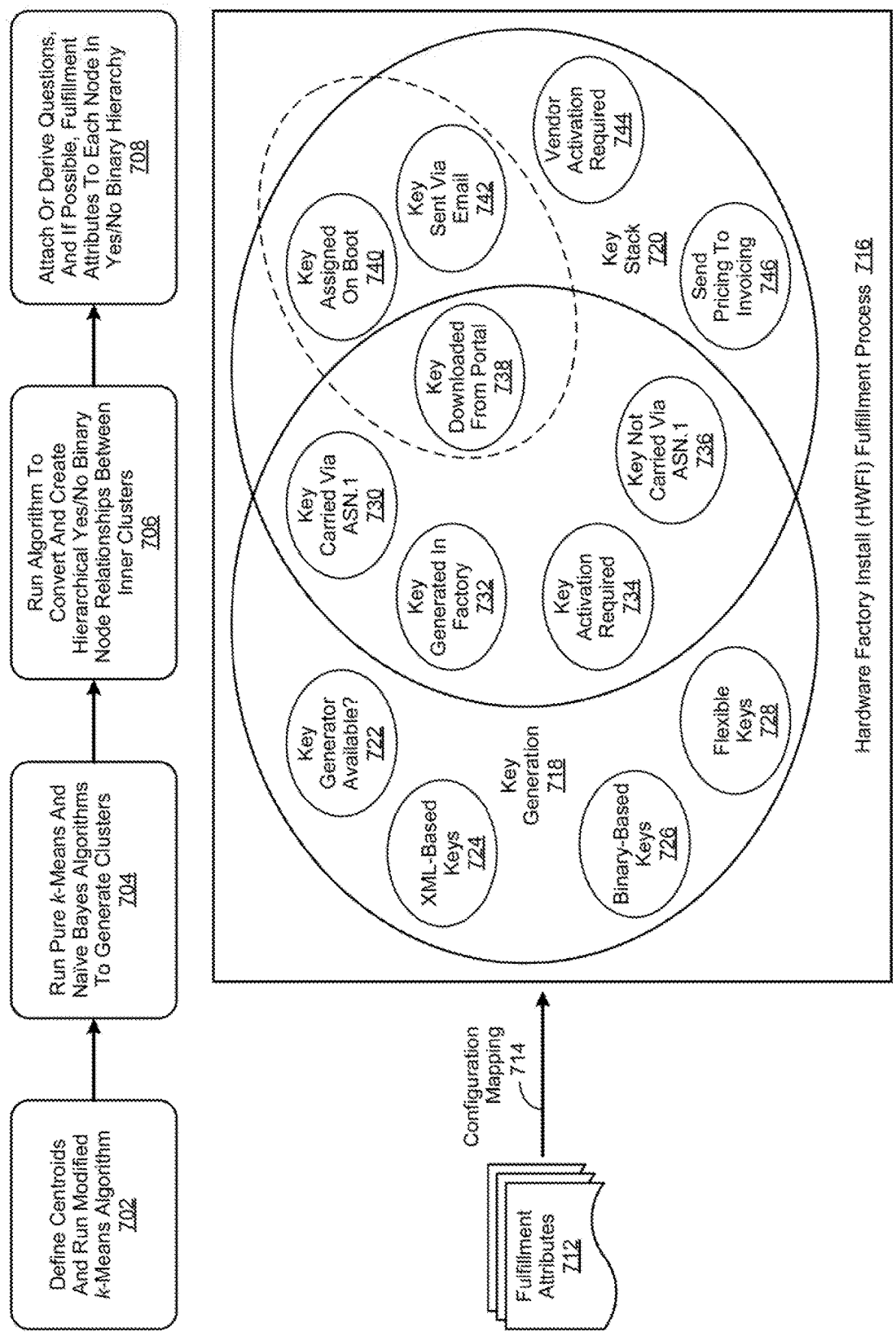
FIG. 7 shows a Venn diagram depicting the intersection of various digital asset fulfillment attributes associated with a Hardware Factory Install (HWFI) digital asset fulfillment process flow.

FIG. 7 shows a Venn diagram depicting the intersection of various digital asset fulfillment attributes associated with a Hardware Factory Install (HWFI) asset fulfillment process flow implemented in accordance with an embodiment of the invention. In this embodiment, a modified k-Means algorithm, described in greater detail herein, is used in step 702 to define centroids associated with various digital asset entitlements. The resulting centroids are then used in step 704 by unmodified k-Means and nave Bayes algorithms to generate clusters of digital asset entitlements.

In turn, another algorithm is used in step 706, as likewise described in greater detail herein, to convert attributes associated with the resulting clusters of digital asset entitlements into hierarchical yes/no binary node relationships. Existing or derived questions related to the fulfillment of a particular digital asset are then associated with corresponding nodes in step 708 to generate a binary decision tree. In various embodiments, questions associated with certain nodes in the binary decision tree may be implemented as a digital asset fulfillment chatbot dialog.

For example, as shown in FIG. 7, a nave Bayes cluster algorithm may be run against all digital asset order types, licensing types, fulfillment types, and invoicing types to generate a cluster of digital asset entitlement attributes associated with an HWFI digital asset fulfillment process flow. As likewise shown in FIG. 7, the resulting cluster of digital asset entitlement attributes associated with the HWFI digital asset fulfillment process flow 716 includes clusters of digital asset entitlement attributes associated with key generation 718 and a key stack 720. As used herein, key generation broadly refers to various approaches familiar to skilled practitioners of the art for generating, keys used for licensing, or entitlements, associated with a digital asset. As likewise used herein, a key stack broadly refers to a group of keys provided by a third party, such as a software vendor, used for licensing, or entitlements, associated with a digital asset.

In certain embodiments, a naïve Bays and a modified k-Means algorithm may be implemented in combination, as described in greater detail herein, to categorize various functionalities within a particular cluster of digital asset entitlement attributes 712, such as the cluster associated with a HWFI digital asset fulfillment process flow 716. To continue the prior example, a particular digital asset may have certain key generation 718 entitlement attributes, including whether an associated key generator is available 722, whether an associated key is an Extensible Mark-Up (XML) key 724, a binary key 726, or a flexible key 728. Likewise, the digital asset may have certain key stack 720 entitlement attributes, such as key assigned on boot 740, key sent via email 742, vendor activation required 744, and send pricing to invoicing 746. The digital asset may likewise have certain entitlement attributes that are both key generation 718 and key stack 720 entitlement attributes, such as the key is carried via ASN.1 730, or not 736, the key is generated in the factory 732, key activation is required 732, and the key is downloaded from a portal 738.

To further continue the example, a particular digital asset may be fulfilled as a result of executing an HWFI digital asset fulfillment process flow 716. In the case of using a key generation 718 approach for the HWFI digital asset fulfillment process, a customer may only have the option of downloading a key 738 from a system manufacturer portal. However, in the case of a key stack 720 approach for the HWFI digital asset fulfillment process, a customer may likewise have the option of downloading a key 738 from the system manufacturer portal. Furthermore, the customer may likewise have the option assigning a key 740 upon first initiation of associated hardware and having a key sent via email. Accordingly, the configuration of three options 714 may be used to generate or derive associated questions, which can in turn be associated with corresponding nodes to generate a binary decision tree. In various embodiments, questions associated with certain nodes in the binary decision tree may be implemented as a digital asset fulfillment chatbot dialog.

Figure 8B:
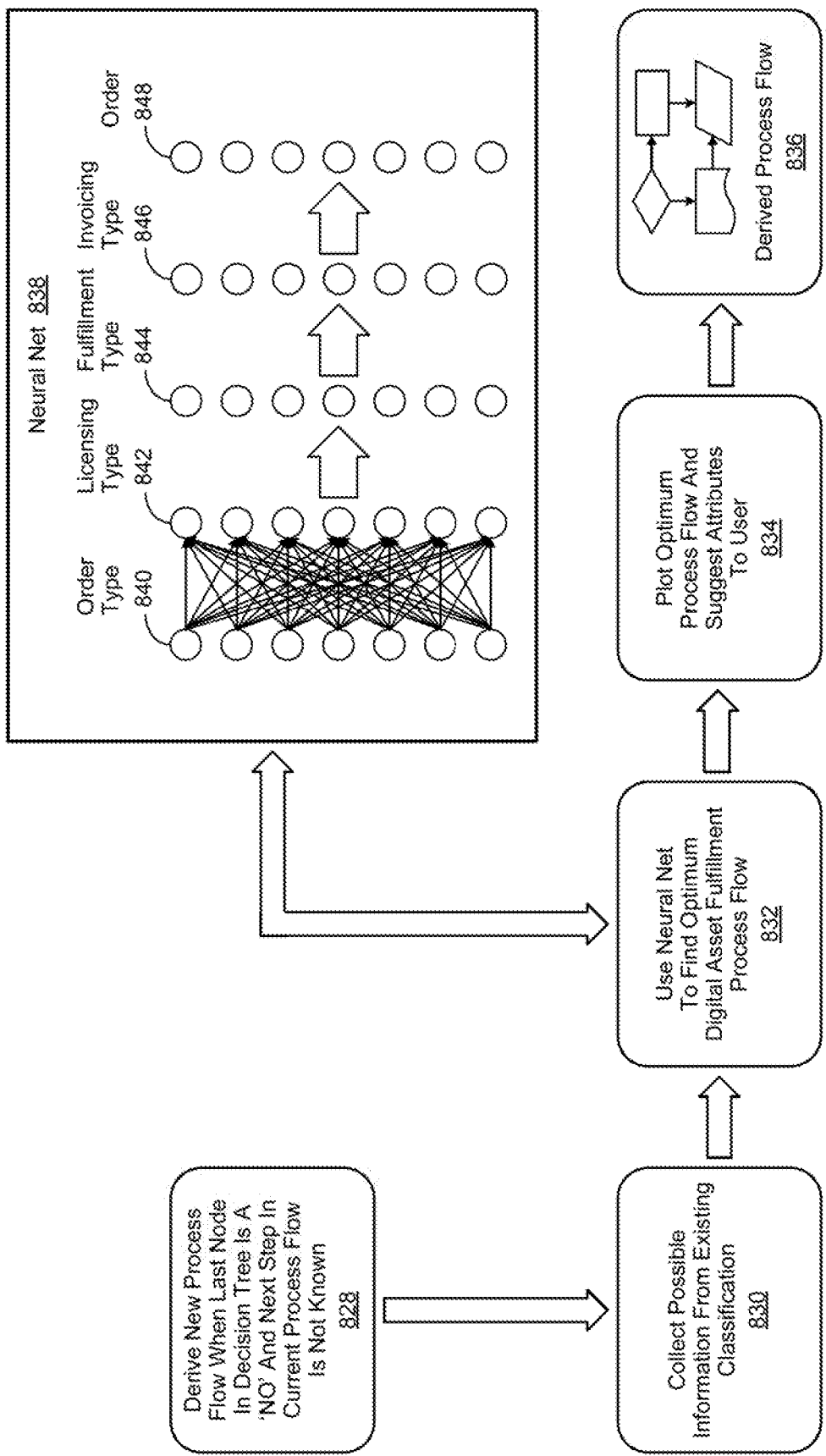
Figure 8C:
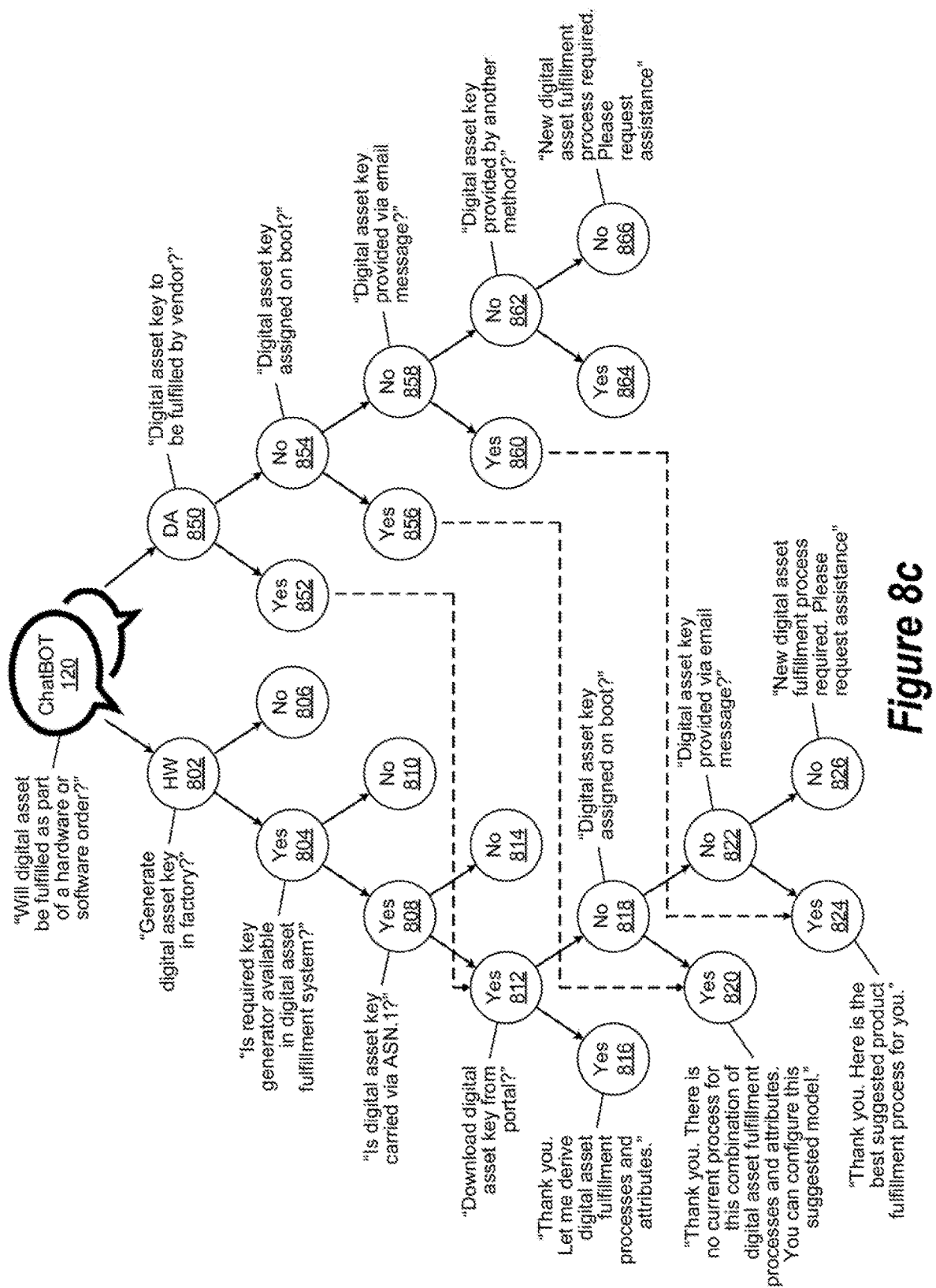

FIGS. 8a through 8c show a binary decision tree implemented in accordance with an embodiment of the invention to derive an alternative digital asset fulfillment process flow. In various embodiments, certain digital asset entitlement attributes are processed, as described in greater detail herein, to generate a digital decision tree for the fulfillment of a particular digital asset. As likewise described in greater detail herein, questions corresponding to fulfillment of the digital asset are then associated with corresponding nodes of the binary decision tree. In various embodiments, questions associated with certain nodes in the binary decision tree may be implemented as a digital asset fulfillment chatbot 120 dialog.

As an example, the digital asset fulfillment chatbot 120 may be implemented to first ask whether an order for a particular digital asset is part of an order for associated hardware 802 or only for the digital asset 850 itself if hardware 802 is selected, then the next question may be whether a key for the digital asset is to be generated in the factory. If not, then the digital asset fulfillment process flow may be terminated at node 806 if no process exists for fulfilling the digital asset without a factory-generated key. Otherwise, the question associated with node 804 may be whether a required key generator is available. If not, then the digital asset fulfillment process may be terminated at node 810.

Otherwise, the question associated with node 808 may be whether the digital asset key is carried via ASN.1. If not, then the digital asset fulfillment process may be terminated at node 814. Otherwise, the question associated with node 812 may be whether to download a key for the digital asset from a portal. If so, then the response associated with node 816 may be that a digital asset fulfillment process flow, and associated entitlement attributes, will be derived.

Otherwise, the question associated with node 818 may be whether the key for the digital asset will be assigned upon initial boot. If the answer is affirmative, the response associated with node 820 may be that no current digital asset fulfillment process flow currently exists for this entitlement attribute and that the user can configure a suggested model for doing so. Otherwise, the question associated with node 822 may be whether the key for the digital asset will be provided via entail. If so, then the response associated with node 824 may be the provision of a suggested digital asset fulfillment process flow. Otherwise, the response associated with node 826 may be that no optimum digital asset fulfillment process flow exists for the digital asset and the user may wish to request assistance.

However, in certain embodiments, derivation of a new digital asset fulfillment process flow may be initiated in step 828 if the last node of an associated binary decision tree has been reached and the next step for the current digital asset fulfillment process is unknown. If so, as shown in FIG. 8b, possible information associated with the existing classification may be collected in step 830, and then used by a neural net 838 in step 832 to derive an optimum digital asset fulfillment process flow. As an example, answers to previous questions may be collected and then provided as input data to the neural net 838 in deriving an optimum digital asset fulfillment process flow.

In certain embodiments, the nodes in the neural net 838 may include information associated with the digital asset order type 840, its licensing type 842, its fulfillment type 846, and the resulting order 848 itself in certain embodiments, an optimum digital asset fulfillment process flow resulting from using the neural net 834 may be plotted in step 834, along with providing suggested digital asset entitlement attributes to the user. The derived digital asset fulfillment process flow is then graphically provided to the user for review in step 836.

In certain embodiments, the optimum digital asset fulfillment process flow derived in step 832 may include the use of individual steps associated with another digital asset fulfillment process flow. As an example, as shown in FIG. 8c, if "digital asset" is selected as the response to the initial question asked by the digital asset fulfillment chatbot 120, then the question associated with node 850 may be whether a key for the digital asset is to be fulfilled by an associated vendor. If the answer associated with node 852 is affirmative, then the corresponding digital asset fulfillment process step may be associated with node 812. If not, then the question associated with step 854 may be whether the key for the digital asset will be assigned upon initial boot of an associated system.

If the answer associated with node 856 is affirmative, then the corresponding digital asset fulfillment process step may be associated with node 820. Otherwise, the question associated with step 858 may be whether the key for the digital asset will be provided via email. If the answer associated with node 860 is affirmative, then the corresponding digital asset fulfillment process step, may be associated with node 824. Otherwise, the question associated with step 862 may be whether the key for the digital asset will be provided by another method. If so then the process is continued, proceeding with node 864. Otherwise, the response associated with node 866 may be that a new digital asset fulfillment process is required and to please request assistance. Those of skill in the art will recognize that many such embodiments and examples are possible. Accordingly, the foregoing is not intended to limit the spirit, scope or intent of the invention.

Figure 9:
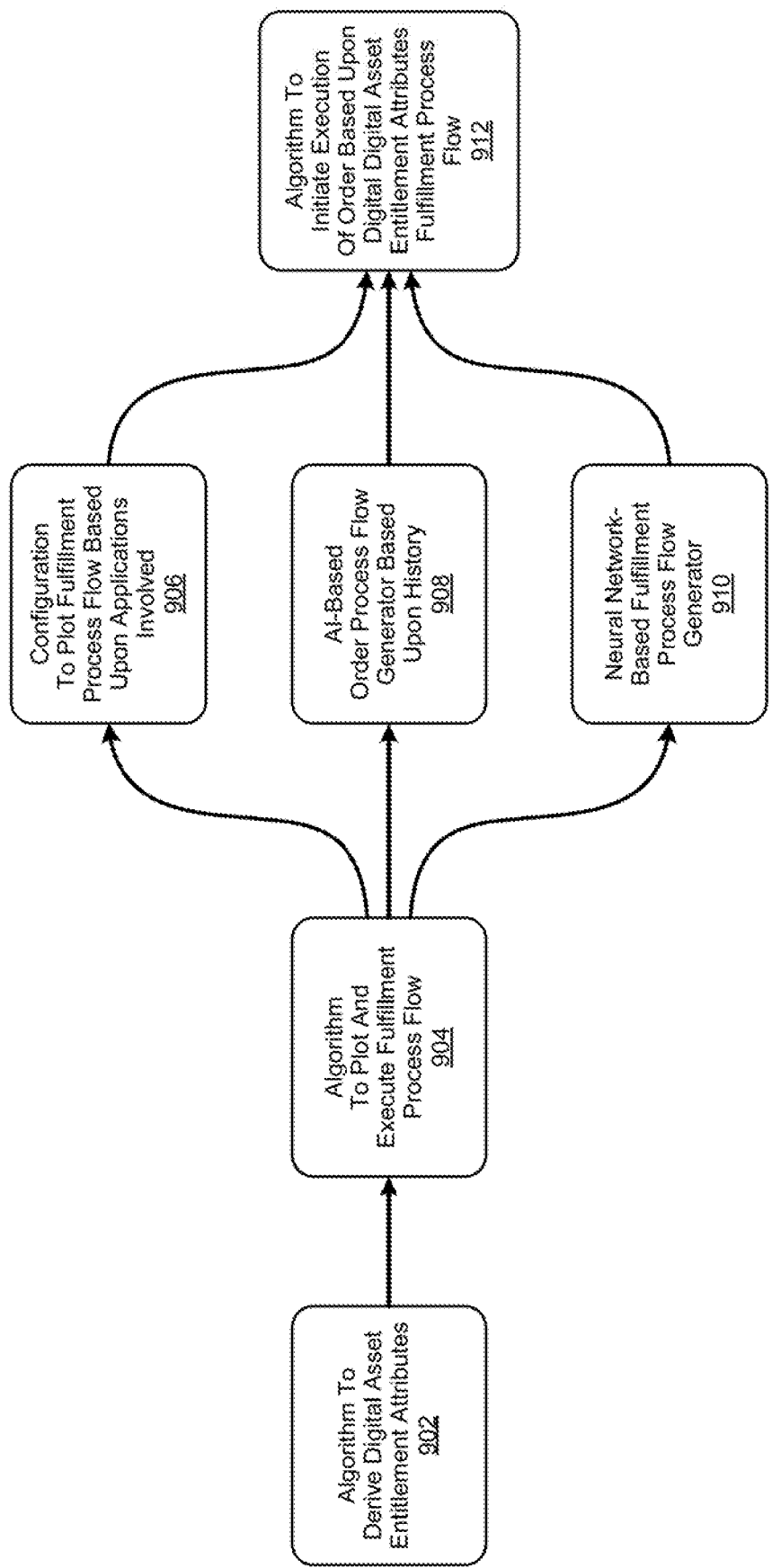
FIG. 9 shows a simplified process flow diagram showing the use of algorithms implemented to derive, plot, and execute a digital asset fulfillment process flow.

FIG. 9 shows a simplified process flow diagram showing the use of algorithms implemented in accordance with an embodiment of the invention to derive, plot, and execute a digital asset fulfillment process flow.

In certain embodiments, an algorithm may be implemented in step 902 to derive various digital asset entitlement attributes, described in greater detail herein. The resulting digital asset entitlement attributes may then be used in step 904 to plot and execute a digital asset fulfillment process flow. In certain embodiments, a configuration may be used in step 906 to plot the digital asset fulfillment process flow according to various systems, applications, processes, and operations that may be involved. In certain embodiments, an artificial intelligence (AI)-based order process flow generator may be implemented in step 908 to use order history in plotting the digital asset process fulfillment flow. In certain embodiments, a neural network-based fulfillment process flow generator may be implemented in step 910 to plot the digital asset process flow. In certain embodiments, once process steps 906, 908, and 910 are completed, whether individually or in combination, an algorithm may be implemented in step 912 to initiate an order for a particular digital asset based upon the previously derived digital asset fulfillment process flow and associated entitlement attributes.

Figure 10:
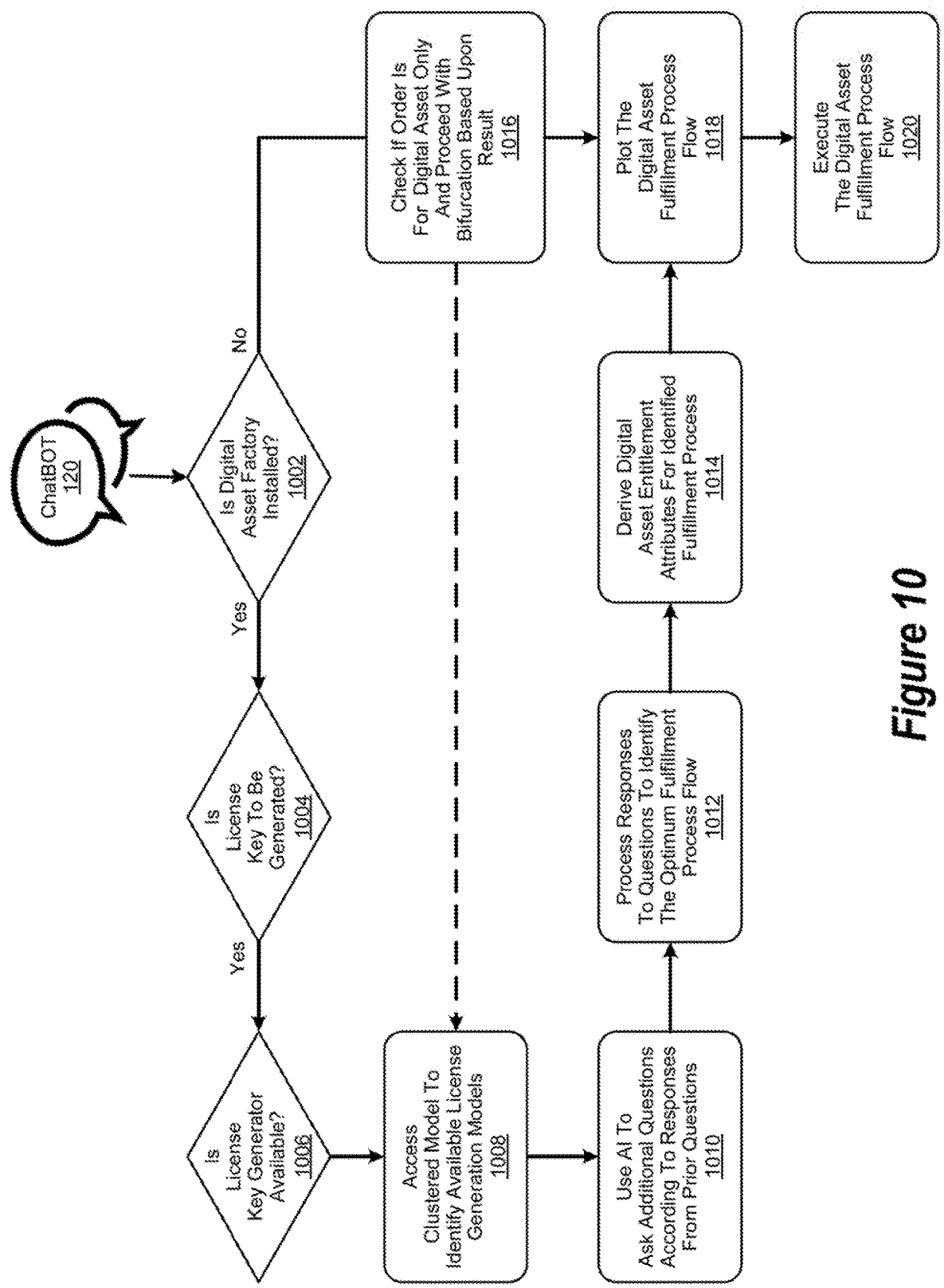
FIG. 10 is a simplified flow chart showing the performance of operations for deriving, plotting, and executing a digital asset fulfillment process flow.

FIG. 10 is a simplified flow chart showing the performance of operations implemented in accordance with an embodiment of the invention for deriving, plotting, and executing a digital asset fulfillment process flow. In this embodiment, a digital asset fulfillment chatbot 120, described in greater detail herein, may be implemented to conduct a dialog with a user to collect information associated with the fulfillment of a digital asset. For example, as shown in FIG. 10, a determination may be made in step 1002 whether or not the digital asset is to be factory installed. If so, then a determination is made in step 1004 whether a license key for the digital asset is to be generated. If so, then a determination is made in step 1006 whether the required license key generator is available.

If so, then a k-Means clustered model, described in greater detail herein, is accessed in step 1008 to identify available license key generation models. Thereafter, artificial intelligence (AI) approaches familiar to skilled practitioners of the art may be implemented in step 1010 to ask additional questions, based upon responses to prior questions. The resulting responses are then processed in 1012 to identify the optimum digital asset process flow. Digital asset entitlement attributes for the identified digital asset fulfillment process flow are then derived in step 1014. The digital asset fulfillment process flow is then plotted in step 1018 and executed in step 1020. However, if it was determined in step 1002 that the digital asset is not to be installed in the factory, then order for the digital asset is checked in step 1016 to determine whether or not the order is only for the digital asset, According to the result of the determination, the process is continued, proceeding either with step 1018 or 1018.

Figures 11A, 11B:
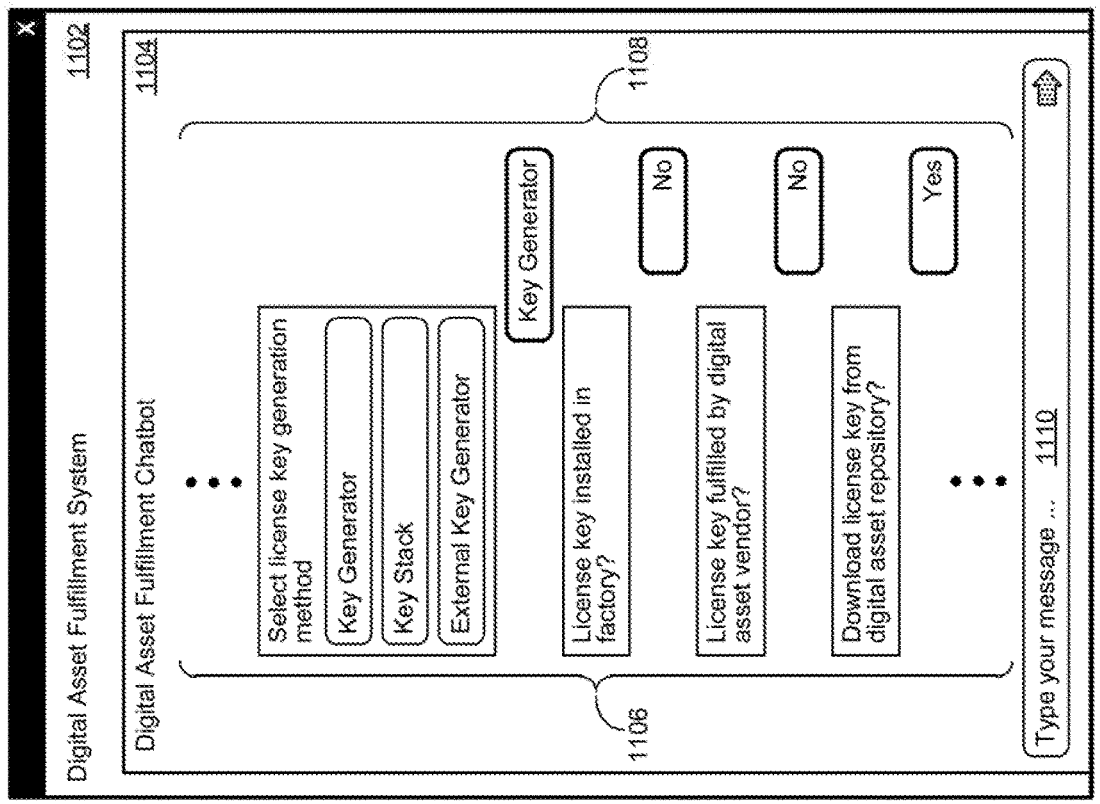
FIGS. 11a and 11b show an example screen presentation of a digital asset fulfillment chatbot user interface (UI).

FIGS. 11*a* and 11*b* show an example screen presentation of a digital asset fulfillment chatbot user interface (UI) implemented in accordance with an embodiment of the invention. In certain embodiments, the UI 1102 of a digital asset fulfillment system may be implemented to include a digital asset fulfillment chatbot UI 1104, which in turn may be implemented to include a text entry box 1110. In certain embodiments, the digital asset fulfillment chatbot UI 1104 may be implemented to include a series of questions 1106 and user responses 1108 corresponding to nodes of a binary decision tree, described in greater detail herein. In certain embodiments, the user responses 1108 to the series of questions 1106 may be used to determine an optimum digital asset fulfillment process flow, as likewise described in greater detail herein.

Figure 12:
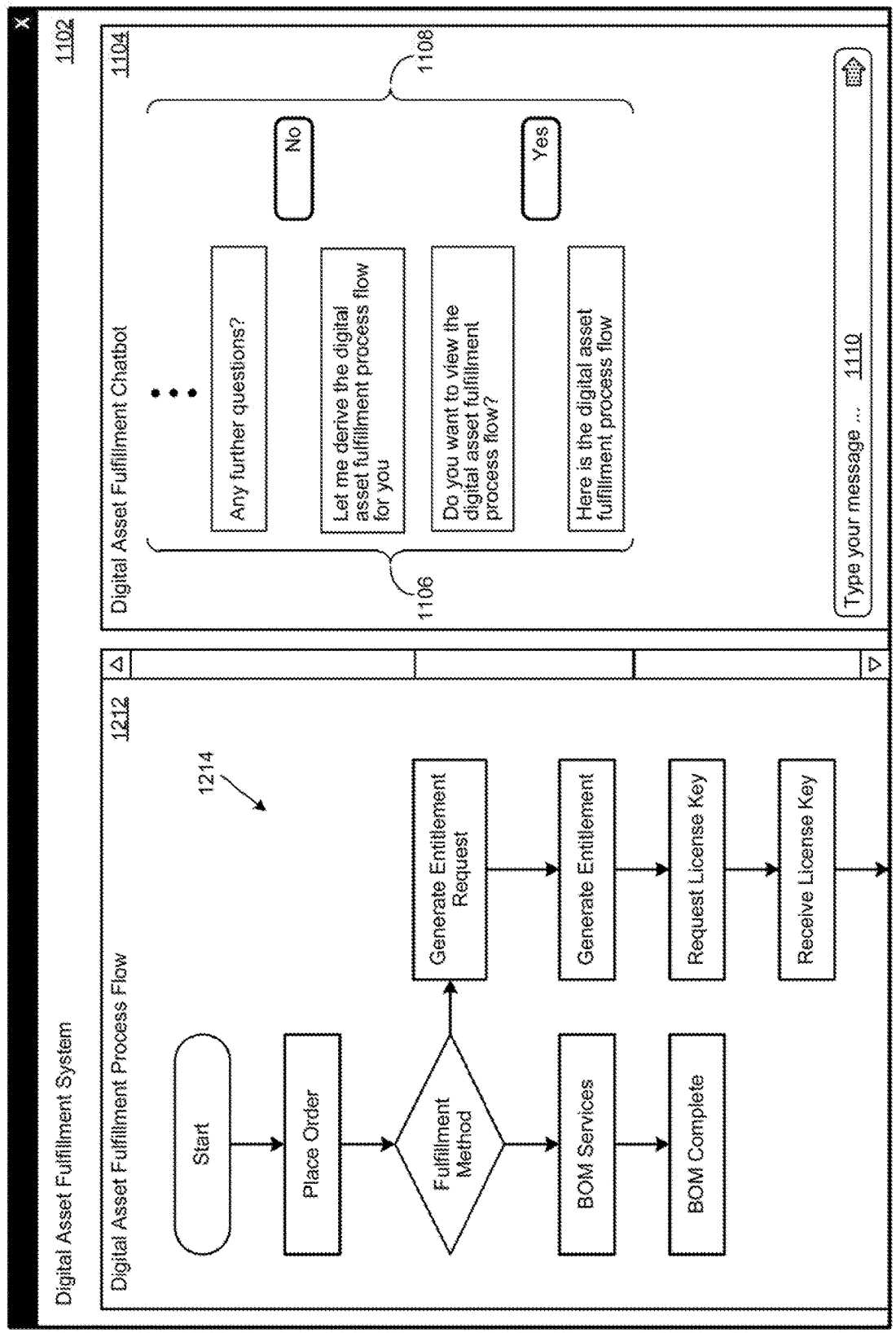
FIG. 12 shows an example screen presentation of a derived digital asset fulfillment plot.

FIG. 12 shows an example screen presentation of a derived digital asset fulfillment plot implemented in accordance with an embodiment of the invention. In certain embodiments, the UI 1102 of a digital asset fulfillment system may likewise be implemented to include a digital asset process flow UI 1212, which in certain turn may be implemented to display a digital asset process flow 1214.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of, a computer program product on a computer-usable storage medium having computer-usable program code embodied in the medium.

Any suitable computer usable Or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the User's computer and partly on a remote computer or entirely on the remote computer or server, in the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing a digital fulfillment product onboarding operation, comprising:
   receiving an order for a digital asset, the order for the digital asset being associated with a customer order for a hardware device, the hardware device comprising an ordered information handling system;
   deriving digital fulfillment attributes associated with the digital asset;
   identifying a digital asset fulfillment process flow from a plurality of digital asset fulfillment process flows, the identifying being based upon the order for the digital asset and the attributes associated with the digital asset, the plurality of digital asset process flows being stored within a repository of digital asset fulfillment data, the identifying the digital asset fulfillment process flow including an interactive session with a digital asset fulfillment chatbot, the interactive session with the digital asset fulfillment chatbot comprising a series of prompts regarding fulfillment of a particular asset provided by the digital asset fulfillment chatbot;
   plotting the digital asset fulfillment process flow to provide a plotted digital asset fulfillment process flow, the plotted digital asset fulfillment process flow comprising a scatter plot depicting clusters of entitlement attributes associated with various digital asset fulfillment types;
   manufacturing the ordered information handling system, manufacture of the ordered information handling system taking into account the plotted digital asset fulfillment process flow; and,
   executing the digital asset fulfillment process flow.

2. The method of claim 1, wherein:
   the deriving digital fulfillment attributes associated with the digital asset further comprises performing a digital asset attribute identification operation, the digital asset attribute identification operation collecting product details of the digital asset.

3. The method of claim 1, wherein:
   the identifying the digital asset fulfillment process flow comprises determining whether the plurality of digital asset fulfillment process flows comprises a particular digital asset fulfillment process flow; and,
   generating a new digital asset fulfillment process flow using attributes associated with the digital asset, related questions and received responses.

4. The method of claim 1, wherein:
   the identifying the digital asset fulfillment process flow comprises performing a binary tree decision operation using a binary decision tree, the binary tree decision operation determining which of the plurality of digital asset fulfillment process flows to use for the order based upon answers to questions corresponding to fulfillment of the digital asset;
   determining when a last node of the binary decision tree results in a negative response; and,
   using a neural net to identify an optimum digital asset fulfillment process flow when the last node of the binary tree results in the negative response, the neural net comprising information associated with a digital asset order type, a licensing type, a fulfillment type, and a resulting order, the optimum digital asset fulfillment process flow providing suggested digital asset entitlement attributes.

5. The method of claim 1, wherein:
   the plotting the digital asset fulfillment process flow further comprises performing a digital asset fulfillment process display operation.

6. A system comprising:
   a processor;
   a data bus coupled to the processor; and
   a non-transitory, computer-readable storage medium embodying computer program code, the non-transitory, computer-readable storage medium being coupled to the data bus, the computer program code interacting with a plurality of computer operations and comprising instructions executable by the processor and configured for:
   receiving an order for a digital asset, the order for the digital asset being associated with a customer order for a hardware device, the hardware device comprising an ordered information handling system;
   deriving digital fulfillment attributes associated with the digital asset;
   identifying a digital asset fulfillment process flow from a plurality of digital asset fulfillment process flows, the identifying being based upon the order for the digital asset and the attributes associated with the digital asset, the plurality of digital asset process flows being stored within a repository of digital asset fulfillment data, the identifying the digital asset fulfillment process flow including an interactive session with a digital asset fulfillment chatbot, the interactive session with the digital asset fulfillment chatbot comprising a series of prompts regarding fulfillment of a particular asset provided by the digital asset fulfillment chatbot;
   plotting the digital asset fulfillment process flow to provide a plotted digital asset fulfillment process flow, the plotted digital asset fulfillment process flow comprising a scatter plot depicting clusters of entitlement attributes associated with various digital asset fulfillment types;
   manufacturing the ordered information handling system, manufacture of the ordered information handling system taking into account the plotted digital asset fulfillment process flow; and,
   executing the digital asset fulfillment process flow.

7. The system of claim 6, wherein:
   the deriving digital fulfillment attributes associated with the digital asset further comprises performing a digital asset attribute identification operation, the digital asset attribute identification operation collecting product details of the digital asset.

8. The system of claim 6, wherein:
   the identifying the digital asset fulfillment process flow comprises determining whether the plurality of digital asset fulfillment process flows comprises a particular digital asset fulfillment process flow; and, generating a new digital asset fulfillment process flow using attributes associated with the digital asset, related questions and received responses.

9. The system of claim 6, wherein:

the identifying the digital fulfillment process flow comprises performing a binary tree decision operation using a binary decision tree, the binary tree decision operation determining which of the plurality of digital asset fulfillment process flows to use for the order based upon answers to questions corresponding to fulfillment of the digital asset;

determining when a last node of the binary decision tree results in a negative response; and, using a neural net to identify an optimum digital asset fulfillment process flow when the last node of the binary tree results in the negative response, the neural net comprising information associated with a digital asset order type, a licensing type, a fulfillment type, and a resulting order, the optimum digital asset fulfillment process flow providing suggested digital asset entitlement attributes.

10. The system of claim 6, wherein:

the plotting the digital asset fulfillment process flow further comprises performing a digital asset fulfillment process display operation.

11. A non-transitory, computer-readable storage medium embodying computer program code, the computer program code comprising computer executable instructions configured for:

receiving an order for a digital asset, the order for the digital asset being associated with a customer order for a hardware device, the hardware device comprising an ordered information handling system;

deriving digital fulfillment attributes associated with the digital asset;

identifying a digital asset fulfillment process flow from a plurality of digital asset fulfillment process flows, the identifying being based upon the order for the digital asset and the attributes associated with the digital asset, the plurality of digital asset process flows being stored within a repository of digital asset fulfillment data, the identifying the digital asset fulfillment process flow including an interactive session with a digital asset fulfillment chatbot, the interactive session with the digital asset fulfillment chatbot comprising a series of prompts regarding fulfillment of a particular asset provided by the digital asset fulfillment chatbot;

plotting the digital asset fulfillment process flow to provide a plotted digital asset fulfillment process flow, the plotted digital asset fulfillment process flow comprising a scatter plot depicting clusters of entitlement attributes associated with various digital asset fulfillment types;

manufacturing the ordered information handling system, manufacture of the ordered information handling system taking into account the plotted digital asset fulfillment process flow; and, executing the digital asset fulfillment process flow.

12. The non-transitory, computer-readable storage medium of claim 11, wherein the computer executable instructions are further configured for:

the deriving digital fulfillment attributes associated with the digital asset further comprises performing a digital asset attribute identification operation, the digital asset attribute identification operation collecting product details of the digital asset.

13. The non-transitory, computer-readable storage medium of claim 11, wherein:

the identifying the digital asset fulfillment process flow comprises determining whether the plurality of digital asset fulfillment process flows comprises a particular digital asset fulfillment process flow; and, generating a new digital asset fulfillment process flow using attributes associated with the digital asset, related questions and received responses.

14. The non-transitory, computer-readable storage medium of claim 11, wherein:

the identifying the digital fulfillment process flow comprises performing a binary tree decision operation using a binary decision tree, the binary tree decision operation determining which of the plurality of digital asset fulfillment process flows to use for the order based upon answers to questions corresponding to fulfillment of the digital asset;

determining when a last node of the binary decision tree results in a negative response; and, using a neural net to identify an optimum digital asset fulfillment process flow when the last node of the binary tree results in the negative response, the neural net comprising information associated with a digital asset order type, a licensing type, a fulfillment type, and a resulting order, the optimum digital asset fulfillment process flow providing suggested digital asset entitlement attributes.

15. The non-transitory, computer-readable storage medium of claim 11, wherein:

the plotting the digital asset fulfillment process flow further comprises performing a digital asset fulfillment process display operation.

16. The non-transitory, computer-readable storage medium of claim 11, wherein:

the computer executable instructions are deployable to a client system from a server system at a remote location.

17. The non-transitory, computer-readable storage medium of claim 11, wherein:

the computer executable instructions are provided by a service provider to a user on an on-demand basis.

* * * * *